United States Patent [19]
Horwitz

[11] Patent Number: 6,006,263
[45] Date of Patent: Dec. 21, 1999

[54] SYSTEM AND METHOD TO EXPEDITE THE TRANSFER OF DATA WITHIN A NETWORK SYSTEM

[75] Inventor: Michael A. Horwitz, Southfield, Mich.

[73] Assignee: Compuware Corporation, Farmington Hills, Mich.

[21] Appl. No.: 09/009,649

[22] Filed: Jan. 20, 1998

[51] Int. Cl.$^6$ ...................................................... G06F 13/00
[52] U.S. Cl. ........................... 709/225; 709/102; 709/238
[58] Field of Search ..................................... 709/102, 104, 709/200, 202, 203, 217, 219, 213, 225, 227, 228, 229, 237, 238, 239, 240, 250, 300, 302; 707/10, 100, 104

[56] References Cited

U.S. PATENT DOCUMENTS

| | | | |
|---|---|---|---|
| 5,442,749 | 8/1995 | Northcutt et al. | 709/219 |
| 5,649,185 | 7/1997 | Antognini et al. | 707/9 |
| 5,852,719 | 12/1998 | Fishler et al. | 709/216 |
| 5,859,852 | 1/1999 | Moura et al. | 370/449 |
| 5,913,028 | 6/1999 | Wang et al. | 709/203 |

*Primary Examiner*—Viet D. Vu
*Attorney, Agent, or Firm*—Fenwick & West LLP

[57] ABSTRACT

A system and method is described for expediting the transfer of data in a network system wherein a user is coupled by a slow-speed data transfer facility to a first user environment which is the primary interface system for the user. The user begins the process by requesting the download of a data packet. The user interface sends a request for source information to the first user environment along its slow-speed data transfer facility. The response to the request consists of the source information of the data packet. The source information is received by the user interface, and is then sent to the second user environment having a fast-speed data transfer facility. The second user environment locates the data packet using the source information, and downloads the data packet to the user interface through the fast-speed data transfer facility. In a further aspect of the invention, the first user environment operates in accordance with CICS protocols, and uses a HLLAPI interface in conjunction with a user interface, and the second user environment is a MVS platform, coupled to the user interface with a TCP/IP connection. The user requests the download of a data packet a block of source code, and the CICS region returns the program name, the date and time it was compiled, and the MVS dataset name containing the source program information. Since CICS runs on a layer on top of MVS, this MVS dataset is available to both operating systems. The source information is then sent to the workstation, restructured and then sent by the workstation through a TCP/IP connection to MVS. MVS receives the source information, locates the dataset, and begins to download the source code.

10 Claims, 11 Drawing Sheets

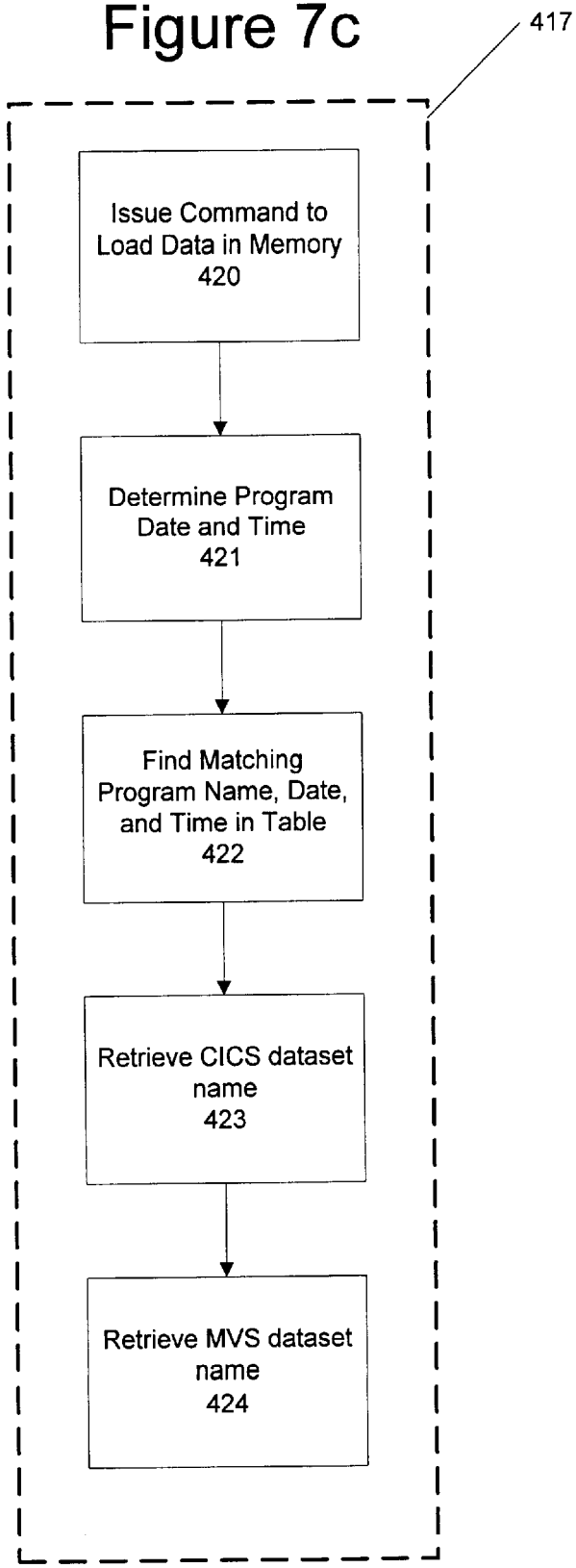

SYSTEM AND METHOD TO EXPEDITE THE TRANSFER OF DATA WITHIN A NETWORK SYSTEM

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to systems and methods of retrieving information in a network environment, and specifically to systems and methods by which information can be efficiently retrieved while operating in a Customer Information Control System environment.

In conventional computer network systems, a user at a workstation is coupled to a mainframe computer through an emulator session. The mainframe computer has several layers of user environments which control the operation of the mainframe. One typical user environment is Customer Interface Communications System ("CICS"), developed by Internal Business Machines corporation ("IBM"). CICS is an operating system that interacts with the mainframe and allows a user to perform operations on the mainframe. A second user environment is the Multi-Variable Storage ("MVS") operating system, also developed by IBM, which is the user environment that directly controls the mainframe. Thus, the CICS user environment must interact with the MVS user environment in order to perform mainframe operations.

The user is typically connected to the CICS region through an emulator session. An emulator session is a logical connection between the mainframe and the workstation. The connection is logical because although the user is coupled to a "screen" that represents the mainframe, there is no physical terminal on the mainframe side. Communication between the emulator session and the workstation is regulated by a conventional High Level Language Application Program Interface ("HLLAPI"). HLLAPI specifies that the user interaction with the mainframe is limited to screen commands, despite the fact that there is no physical terminal present on the mainframe side. That is, the user interacts with the emulator by issuing commands that manipulate the emulator "screen." Keystrokes typed by the user at the workstation are actually transmitted to the mainframe and executed as screen commands. For example, in a typical CICS environment, in order for data to be transferred, a screen command to transfer the data present on an emulator screen must be sent. To send the next screen of data, a second screen command must be sent. Thus, due to the screen command limitation, the data is literally scraped off the screen one screen at a time. This process is conventionally labeled "screen scraping," and is an extremely slow method of retrieving data, as the data transfer rate is limited by the size of the user's emulator screen.

One solution to speed up the transfer of data between the user and the mainframe in a computer system operating in an OS/2 environment would be to use structured fields. Structured fields allow the user to download up to 3 kilobytes of data at a time through the communication subsystem of the emulator, therefore bypassing the screen and the restrictions of the screen size. However, this maximum rate is still very slow. Additionally, a popular operating system, Windows, does not support write structured fields at all. A Transmission Control Protocol/Internet Protocol (TCP/IP) connection directly to the mainframe would provide a dramatically faster transfer rate, but conventional CICS environments do not support TCP/IP. CICS 3.3 and higher do support a TCP/IP connection, but it is a cost add on. CICS 3.2 and lower do not support it at all.

Therefore, it would be advantageous if an improved information retrieval system and process could provide efficient information retrieval for users working within the CICS region.

No known solution adequately addresses these needs in a simple, flexible, robust, and inexpensive manner.

SUMMARY OF THE INVENTION

In accordance with the present invention, where there is a first user environment having a slow-speed data transfer facility, and a second user environment having a fast-speed data transfer facility, there is an information retrieval system that, upon receiving a request for a packet of data, retrieves the source information of the data using the slow-speed data transfer utility and then uses the source information to retrieve the data packet using the fast-speed data transfer facility.

The user begins the process by requesting the download of a data packet. The user interface sends a request for source information to the first user environment along its slow-speed data transfer facility. The response to the request consists of the source information of the data packet. The source information is received by the user interface, and is then sent to the second user environment having a fast-speed data transfer facility. The second user environment locates the data packet using the source information, and downloads the data packet to the user interface through the fast-speed data transfer facility.

In a further aspect of the invention, the first user environment operates in accordance with CICS protocols, and uses a HLLAPI interface in conjunction with a user interface, and the second user environment is a MVS platform, coupled to the user interface with a TCP/IP connection.

For example, the user requests the download of a data packet a block of source code, and the CICS region returns the program name, the date and time it was compiled, and the MVS dataset name containing the source program information. Since CICS runs on a layer on top of MVS, this MVS dataset is available to both operating systems. The source information is then sent to the workstation, restructured and then sent by the workstation through a TCP/IP connection to MVS. MVS receives the source information, locates the dataset, and begins to download the source code.

This process greatly simplifies and enhances file transfers for the user. By limiting the CICS download to the source information, the user is free to continue to work in the CICS region while the source code is downloading. By using a TCP/IP connection to download the code, the actual download time is dramatically shortened. As this process is an innovative use of existing system components, implementation of this method is cost-efficient.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been

BRIEF DESCRIPTION OF THE DRAWINGS

FIG. 7c is a functional block diagram of an embodiment of the Locate Source Information component in accordance with the present invention.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
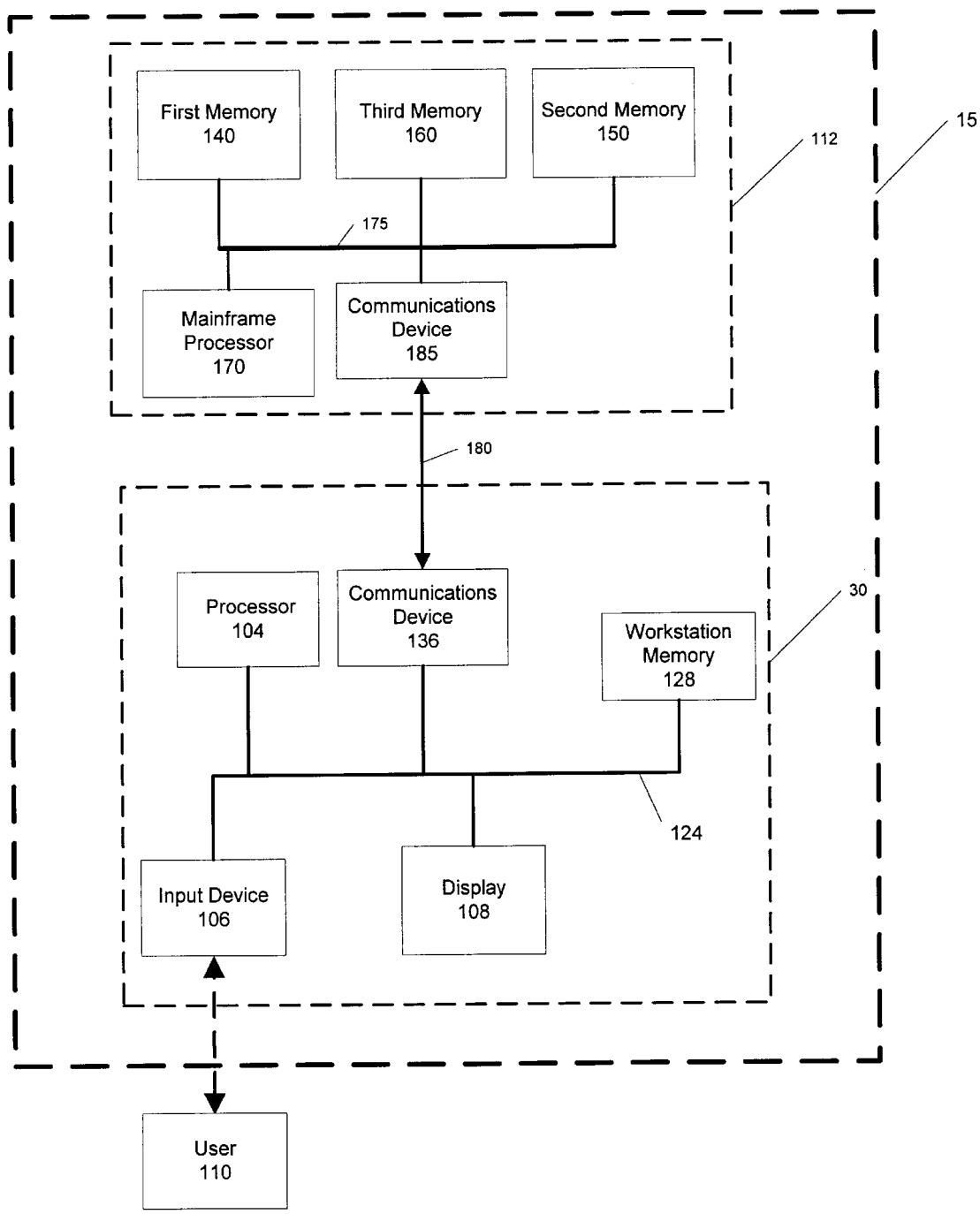
FIG. 1 illustrates a computer network system in accordance with the present invention.

FIG. 1 shows a preferred hardware embodiment of a network system 15 in accordance with the present invention. A workstation 30 is comprised of a processor 104, workstation memory 128, input device 106, display 108, and communications device 136, all interconnected together through a bus 124. The workstation 30 is a personal computer (PC). Alternatively, the workstation 30 can be any conventional terminal. The input device 106 is a mouse. Input device 106 can also be any conventional input or pointing device such as a keyboard, tablet, or touch screen. The input device 106 is used to transmit the user commands to the processor 104 for processing. Memory 128 is used to store application programs, operating systems, and/or datasets. The operating system is a WINDOWS or OS/2 operating system, although other operating systems can be used in accordance with the present invention. The display 108 is used to display text, graphics, or video to the user 110, and can be any conventional display device. Communications device 136 is coupled to workstation 30, and is a modem or, alternatively, a network adapter. The processor 104, display 108, memory 128, input device 106, and communications device 136 are all conventional parts commercially available.

In a preferred embodiment, the workstation 30 is coupled to a remote mainframe 112. Mainframe 112 is comprised of processor 170, communications device 185, first memory 140, second memory 150, and third memory 160 all interconnected through bus 175. The processor 170 and memory 140, 150, 160 are conventional components used in a conventional IBM 370 system. First memory 140 stores a first user environment 10 and second memory 150 stores a second user environment 20. The third memory 160 is preferably used to store datasets that may be required by the user 110. In one embodiment, the datasets stored in third memory 160 are blocks of source code the user 110 may require for programming or debugging purposes. The workstation 30 is coupled to the mainframe 112 by a physical coaxial cable 180, which couples communications device 136 to communications device 185. The mainframe 112 can be locally or remotely located from the workstation 30. One skilled in the art would realize that other configurations of a workstation coupled to a mainframe could also be used within the scope of the present invention. For example, the user environments may be coupled to the user workstation by separate cables or the workstation 30 may be coupled to the mainframe 112 through a Radio Frequency connection instead of or in addition to the physical cable 180.

Figure 2:
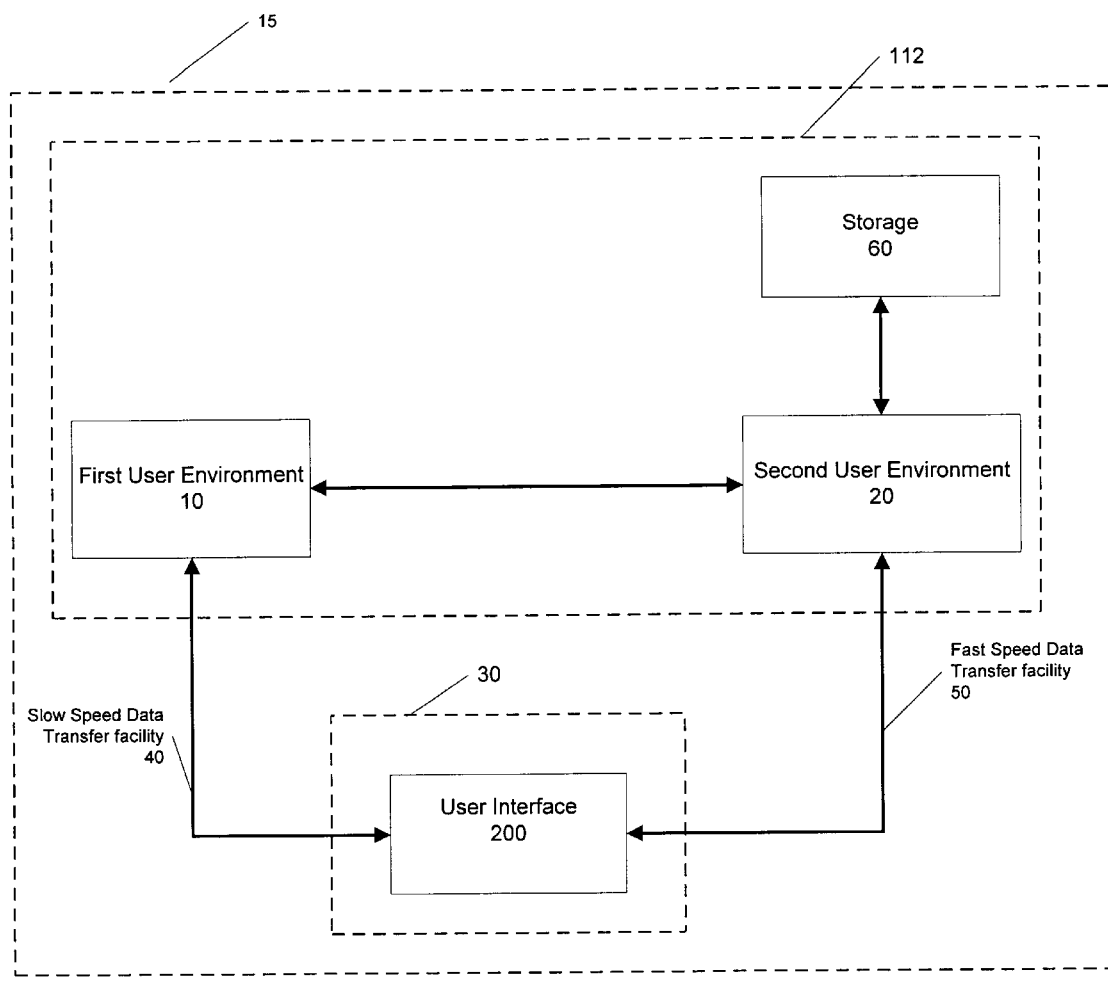
FIG. 2 is a top-level functional block diagram of the network system in accordance with the present invention.

FIG. 2 depicts functional block diagram of network system architecture 15 in accordance with the preferred embodiment of the present invention. Preferably, a user interface 200 is coupled to the first user environment 10 through a slow speed data transfer facility 40 and is coupled to the second user environment 20 through a fast speed data transfer facility 50. User interface 200 resides in memory 128 on workstation 30 and is coupled to user environments 10 and 20. User environment 10 resides in first memory 140 and is also coupled to user environment 20. User environment 20 is coupled to storage 60, and resides in second memory 150.

User environment 10 is an interface system designed to allow for user 110 to interact with storage 60. User environment 20 is an operating system that governs the organization of datasets in storage 60. In order for workstation 30 to access storage 60, the workstation must first access user environment 10, and then have user environment 10 interact with user environment 20 to access storage 60 to accomplish the command of user 110. Storage 60 resides in third memory 160. Storage 60 stores datasets containing information user 110 requires. Network system 15 can include multiple user environments, multiple mainframes 112, multiple storages 60, and multiple workstations 30. Each user environment 10, 20, and storage 60 can itself be divided into separate regions, where access to each region is restricted to a user 110 authorized to use that specific region.

The user interface 200 is preferably a conventional graphical user interface resident in the memory 128 of the user workstation 30. The user interface 200 provides an interface between the user 110 and the workstation 30. The user interface 200 preferably displays network configuration options for the user 110. These options may include the available regions of the network system 15 the user 110 can connect to, a password entry option, and others. Any user interface can be used as user interface 200.

A data transfer facility 40, 50 is a communications protocol that specifies the data transfer rate between two components in a network. In the preferred configuration, the first user environment is coupled to the user interface 200 with a communications protocol which transfers data at a slow speed due to its size and speed limitations. The second user environment 20 is coupled to the workstation 30 through a fast-speed data transfer facility 50. Fast-speed data transfer facility 50 is a communications protocol that allows for the transfer of data at a faster rate than slow-speed data transfer facility 40.

Figure 3:
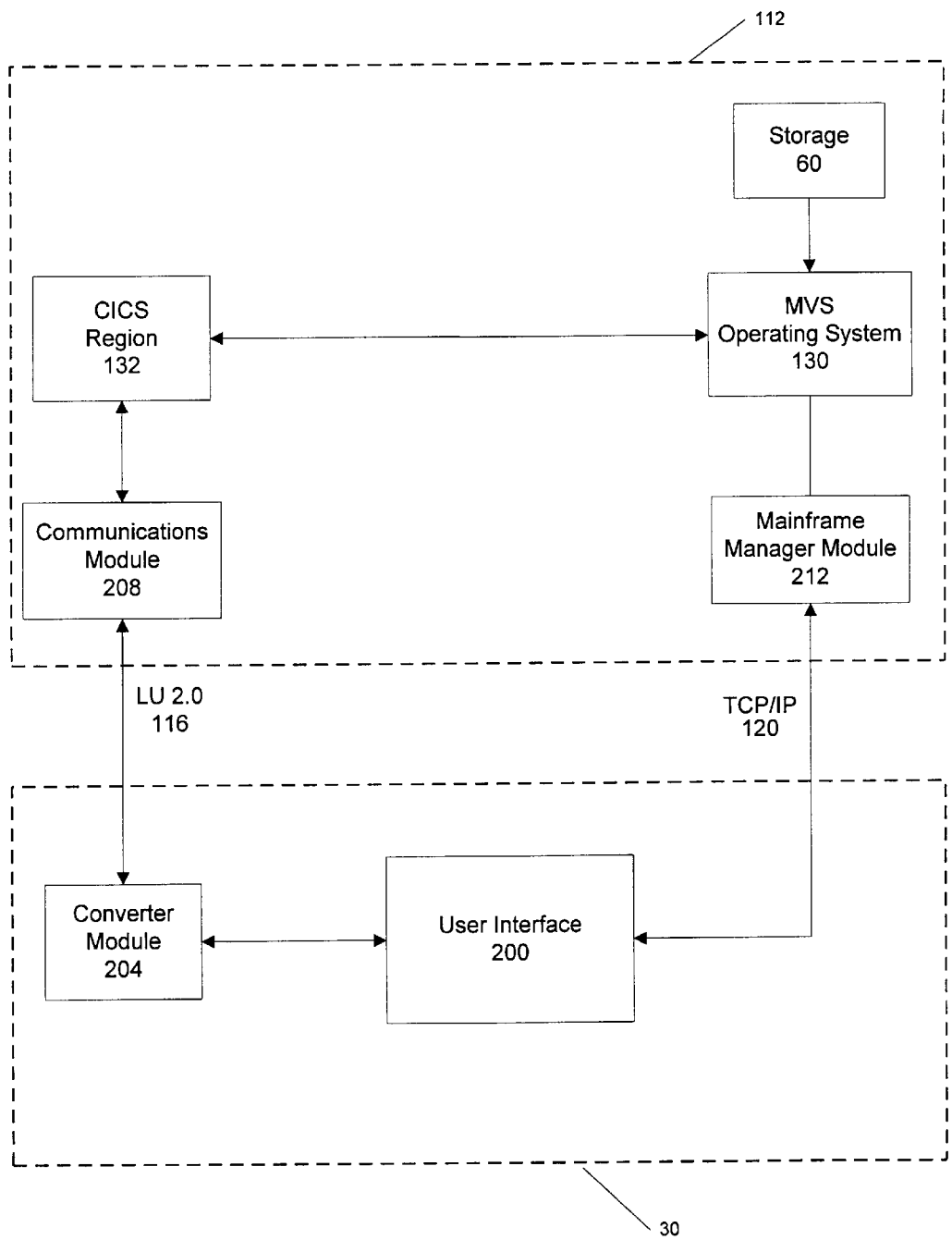
FIG. 3 is a detailed functional block diagram of the network system in accordance with the present invention.

FIG. 3 shows a more detailed functional block diagram of network system architecture 15 in accordance with the present invention. In a preferred embodiment, the first user environment 10 is the CICS interface system 132. CICS 132 is used to monitor, access, and provide information concerning the mainframe 112. User 110 who wants to control storage 60 issues a command in the CICS programming language to the CICS region 132. In one embodiment the CICS region 132 itself is subdivided into regions, such as a CICS A region and a CICS B region. User access to each of these regions is restricted to certain types of users 110. Each CICS subdivided region only has access to certain areas of storage 60.

The CICS region 132 is coupled to the second user environment 20. The second user environment 20 is the MVS operating system 130. The MVS system 130 directly controls the organization of storage 60, and the storing and retrieval of data from storage 60. The CICS region 132 and MVS 130 interact in accordance with a set of conventional protocols specified by IBM. Access to datasets stored in the mainframe 112 is dependent upon having the correct source information regarding the dataset name and where the dataset is located in storage 60. Preferably, the datasets are stored in accordance with the name of the dataset and the date and time the dataset was created. Thus, in a preferred embodiment, in order to retrieve a specific dataset, the above criteria must be known. Typically, if a request for data is made to the CICS region 132 without source information, CICS 132 can determine what the source information is for the requested data and return the correct data. However, if a request for data is made directly to the MVS operating system 130 without source information, no data or the wrong data are retrieved.

As described above, the user interface 200 provides the interface between the user 110 and CICS 132. However, the user interface 200 is typically unable to directly communicate with the CICS region 132. A communications module 208 is required to communicate with the CICS region 132 in order to convert user commands into data strings recognizable by the CICS region 132. The communications module 208 issues commands to CICS 132 to access data stored in storage 60. The communications module 208 has access to all CICS regions 132, and thus can access the entire storage area 60. In the preferred embodiment, the communications module 208 physically resides in a section of first memory 140. However, the communications module 208 can reside in any memory device as long as the memory is coupled to the mainframe processor 170, and can access the CICS region 132.

In one embodiment, the user interface 200 is preferably coupled to a converter module 204. The converter module 204 allows the user interface 200 to communicate with the communications module 208. The converter module 204 resides in memory 128. In the preferred embodiment, the converter module 204 converts commands sent by the user interface 200 into a form recognizable by the communications module 208, and converts information and data sent by the communications module 208 into a form recognizable by the user interface 200. The coupling between the user interface 200 and the converter module 204 is preferably via a WINSOCK interface. WINSOCK is a communications protocol developed by the Microsoft Corporation, and is used in the WINDOWS operating system to govern communication between user interface 200 and a network system 15, and provides TCP/IP sockets for the WINDOWS environment.

An application program interface governs the communication between the user 110, the interface system 132, and the mainframe 112 by providing a set of protocols for communication between an application stored in the memory of the workstation 30 and the interface system 132. In the preferred embodiment, the application program interface is the HLLAPI interface and is slow speed data transfer facility 40. The communication between the interface system 132 layer and the workstation 30 is defined by the HLLAPI to follow the LU 2.0 protocol. Typically, communications between network components is defined by a set of protocols, such as the System Network Architecture (SNA) Logical Unit (LU) protocols, promulgated by IBM. There are different protocols for different communications, such as LU 2.0 which governs communications between a host computer and a mainframe system. The HLLAPI specifies that the communication between the emulator session and the CICS region is governed by the LU 2.0 protocol. The LU 2.0 protocol sets the order of the parameters used for communication between two environments 200, 132. The HLLAPI interface only allows communication in the form of screen commands to be transmitted to the emulator session, as described above. If the user wants to save a file, for example, the user issues a save command, and the screen commands that a user would have to perform to save the file are sent to the emulator session and executed. Thus, all user interaction with the mainframe through the HLLAPI connection must be accomplished through the use of screen commands. Transferring data from the emulator session is limited to screen scraping, where data must be removed from the emulator screen by the use of screen commands, one screen at a time.

The MVS operating system 130 is coupled to the workstation 30 through physical cable 180, providing the user 110 with direct access to the mainframe 112. In a preferred embodiment, this coupling 180 is governed by the TCP/IP communications protocol 120. The TCP/IP communications protocol 120 is fast-speed data transfer facility 50. In ordinary usage, user commands requiring the use of datasets stored on the mainframe 112 are transmitted to the interface system 132 through the LU 2.0 connection 116 prior to reaching MVS operating system 130. Additionally, the user interface 200 typically cannot communicate directly with the MVS operating system 130. Thus, user interface 200 is coupled to a region of the mainframe 112 that allows for communication, preferably a mainframe manager module 212. In the preferred embodiment, the mainframe manager module 212 resides in second memory 150, although the mainframe manager module 212 can reside in any memory as long as it is coupled to mainframe processor 170. The mainframe manager module 212 controls the access and retrieval of data stored in storage 60 by issuing commands through the MVS operating system 130.

In conventional systems, data are typically retrieved from a mainframe after a user request as follows: A user begins an emulator session on a workstation. The workstation, through the LU 2.0 connection, links to the CICS region. The CICS region typically requests the user for a password to authorize use of that CICS region. The user then starts an application program, such as a program debugger, to write and edit source code for a program. At some point, the user requires the use of source code stored on the mainframe. The user requests the download of the source code. The workstation transmits the request through the LU 2.0 connection to the communications program linked to the CICS region. The communications program issues CICS commands to determine the source information of the requested source code, and it transmits the source information and a request for the transfer of the source code to the communications program linked to the MVS operating system. The MVS operating system retrieves the source code using the storage information from the storage area, and transmits the source code back to the CICS region. The CICS communications program then downloads the source code to the user across the LU 2.0 connection, using the extremely slow "screen-scraping" process. While the request is made and the source is being downloaded, the user at the workstation must remain idle, waiting for the completion of the task.

In accordance with the present invention, download time is dramatically improved and parallel processing is offered to allow the user 110 to continue working while waiting for the download of data. User 110 starts an emulator session which couples the workstation 30 to the first user environment 10. The connection is made through the slow-speed data facility 40. User 110 then starts an application program, for example, the XPEDITER+/CICS debugger, commercially available from the Compuware Corporation, which provides a user interface 200 for the user 110 to write and edit source code, typically, COBOL applications, which are stored on the mainframe 112 in storage 60. User 110 then selects a connection option provided by the user interface 200 to connect to a user environment within which the user 110 would like to work. When the application program is enabled, a link with the communications program 208 is initiated, through the slow-speed facility 40. The workstation 30 also initiates a link to the second communications program 212 through the fast-speed data transfer facility 50. The second communications program 212 is then ready to process instructions regarding the second user environment 20 and storage 60.

Figure 4:
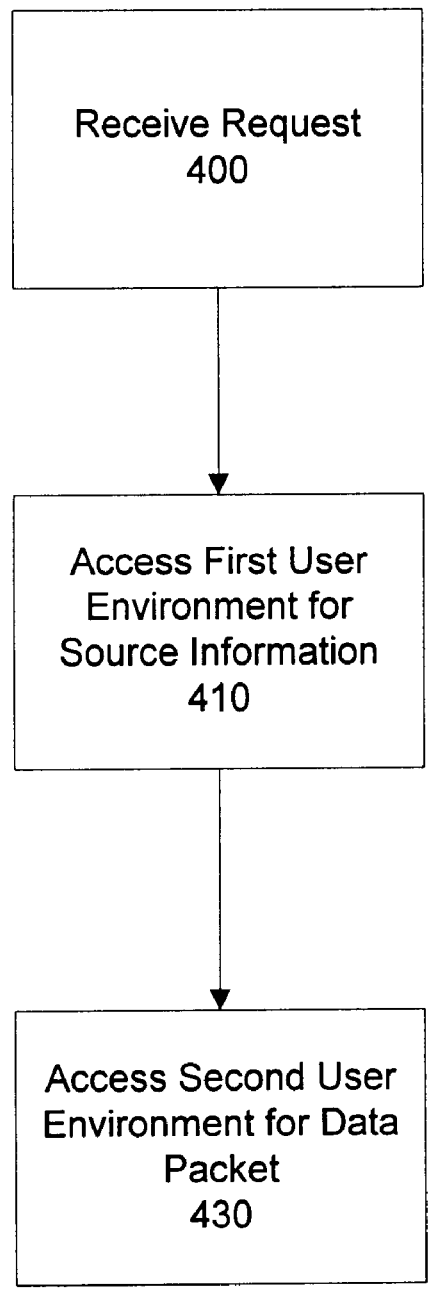
FIG. 4 is a top-level flow chart illustrating one embodiment of the processing of the present invention.

FIG. 4 illustrates the processing of the preferred embodiment of the present invention. When a request is received 400 for a source code download, the user interface 200 accesses 410 the first user environment 10 for the source information required to locate the requested dataset in the storage 60. The first user environment 10 receives the request, locates the source information, and downloads the source information across the slow-speed data transfer facility to the user interface 200. The user interface 200 then accesses 430 the second user environment 20 for the source code. The second user environment 20 receives the source download request along with the source information, and retrieves the source code from storage 60 using the source information. Then the second user environment 20 downloads the source code across the fast-speed data transfer facility 50.

Figure 5:
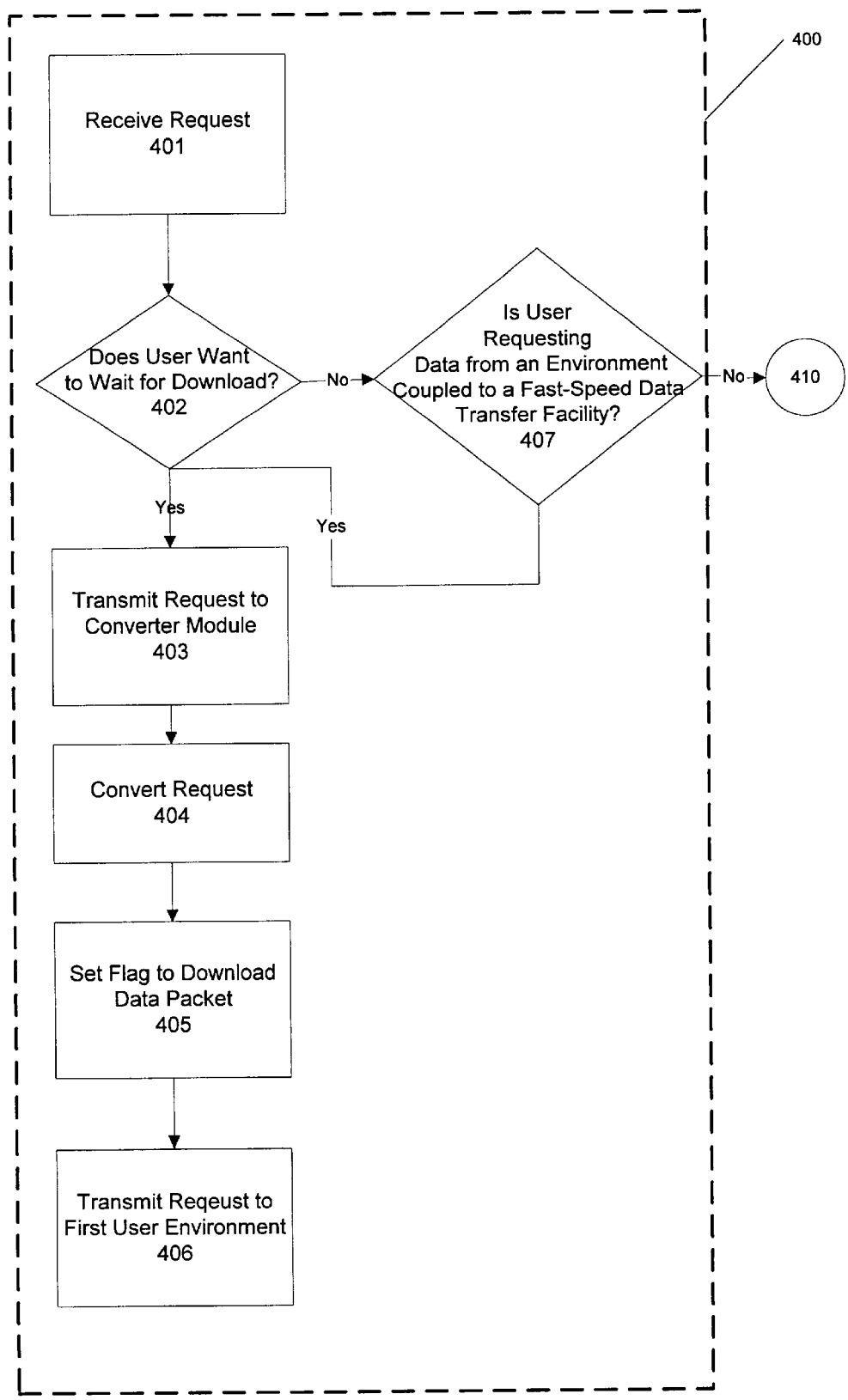
FIG. 5 is a flow chart illustrating an embodiment of the Request Data Packet component in accordance with the present invention.

FIG. 5 shows a more detailed description of the Receive Request block 400. The workstation 30 receives 401 a request via its user interface 200. The request from the user 110 should specify the source program name. The interface 200 in block 402 presents the user 110 with the option of waiting for the data packet to download or having the data packet downloaded in accordance with the present invention. The user 110 may desire to wait for the download if, for example, the MVS communication link 120 is down. If the user 110 does want to wait, then the system downloads the data packet from the CICS region 132 in the conventional manner, as described above. The process begins when the user interface 200 transmits 403 a request to the converter module 204 to download the data packet containing the source code the user 110 requested. Next, the converter module 204 converts 404 the request into a command that is compatible with the communications module 208. Then, the converter module 204 sets 405 a flag that the data packet should be downloaded by the CICS region 132. The converter module 204 then transmits 406 to the communications module 208 a request for the source to be downloaded. The converter module 204 and the user 110 then waits for the download to occur.

If the user 110 does not want to wait for the source code to be downloaded, then the system accesses 410 the first user environment for the source information. In an embodiment with multiple storage devices 60 or multiple CICS regions 132, the workstation 30 first determines 407 whether the CICS region 132 that can access the requested data is coupled to a slow-speed data transfer facility 40 or a fast-speed data transfer facility 50. If there is a fast-speed data transfer facility 50, then the workstation 30 requests the automatic downloading of source code from the interface system 132 and proceeds to block 403. If there is a slow speed connection, then the workstation 30 proceeds to step 410. For example, if there is a network 15 with one mainframe 112 operating under CICS 132 that independently supports TCP/IP, and others with a version of CICS 132 that did not, if the data the user 110 requests is made to a CICS region 132 that supports TCP/IP, then the source code would be downloaded automatically. If the request is made to an environment 10 that does not support a fast speed data transfer facility 50, then the system proceeds to step 410. The option to choose whether or not to download using the slow-speed data transfer facility 40 can be eliminated in systems where the system designer feels that it is always beneficial to download the source code using a fast speed data transfer facility 50 or there is only one interface system 132 present in the network 15.

Figure 6:
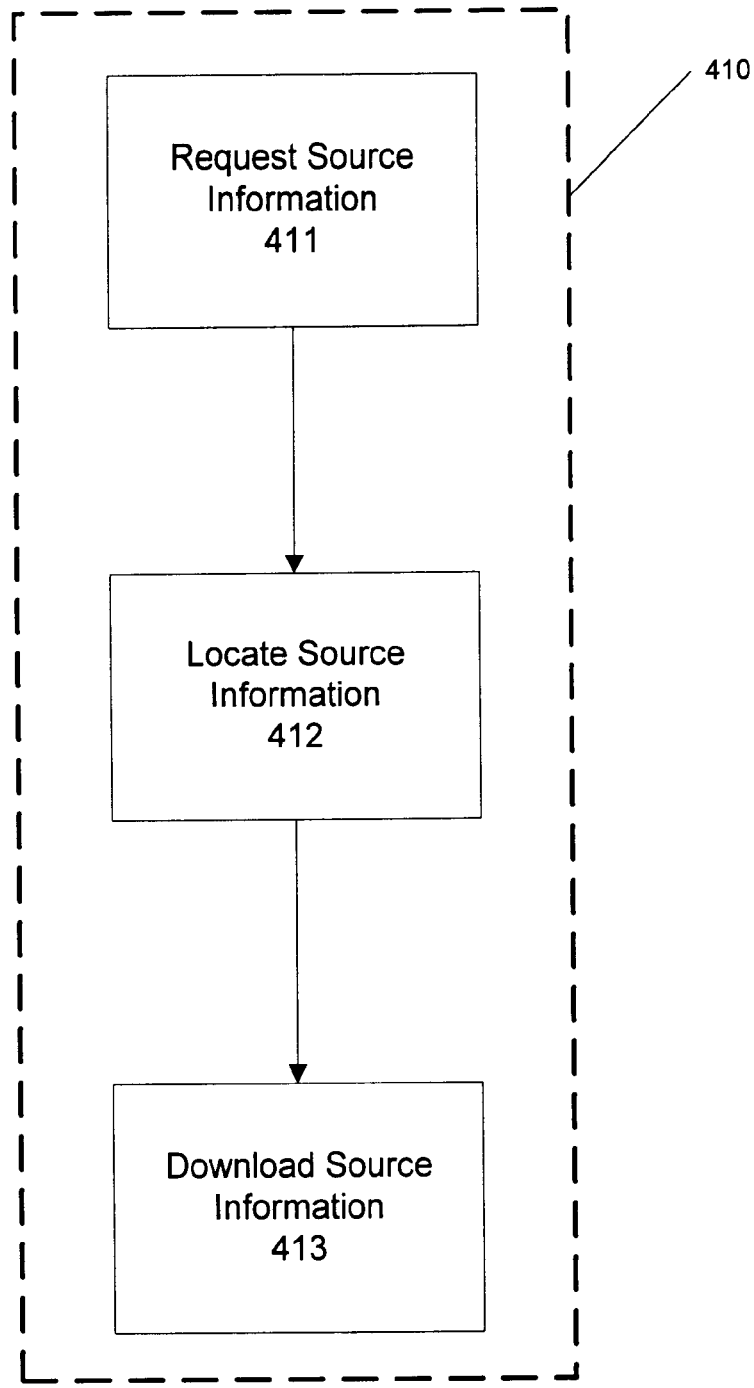
FIG. 6 is a flow chart illustrating an embodiment of the Access Source Information component in accordance with the present invention.

FIG. 6 depicts in more detail the Accesses the First User Environment for Source Information 410 block in accordance with the present invention. The user interface 200 requests 411 source information from the first user environment 10. In a system where the first user environment 10 is a CICS region 132, then this system must access the communications program 208 to have the communications program 208 translate the commands. However, in one embodiment, commands are issued from the user interface 110 that directly control the CICS region 132 without the need for the communications program 208. Therefore, in this embodiment, or in an embodiment where the first user environment 10 is not a CICS region 132, the workstation can directly access the first user environment 10 for the source information.

The first user environment 10 then locates 412 the source information requested. The first user environment 10 issues commands to the second user environment 20 to have the second user environment search in the storage 60 to locate the source information. The second user environment 20 returns the source information to the first user environment 10. Finally, the first user environment 10 downloads 413 the source information to the user interface 200.

Figure 7A:
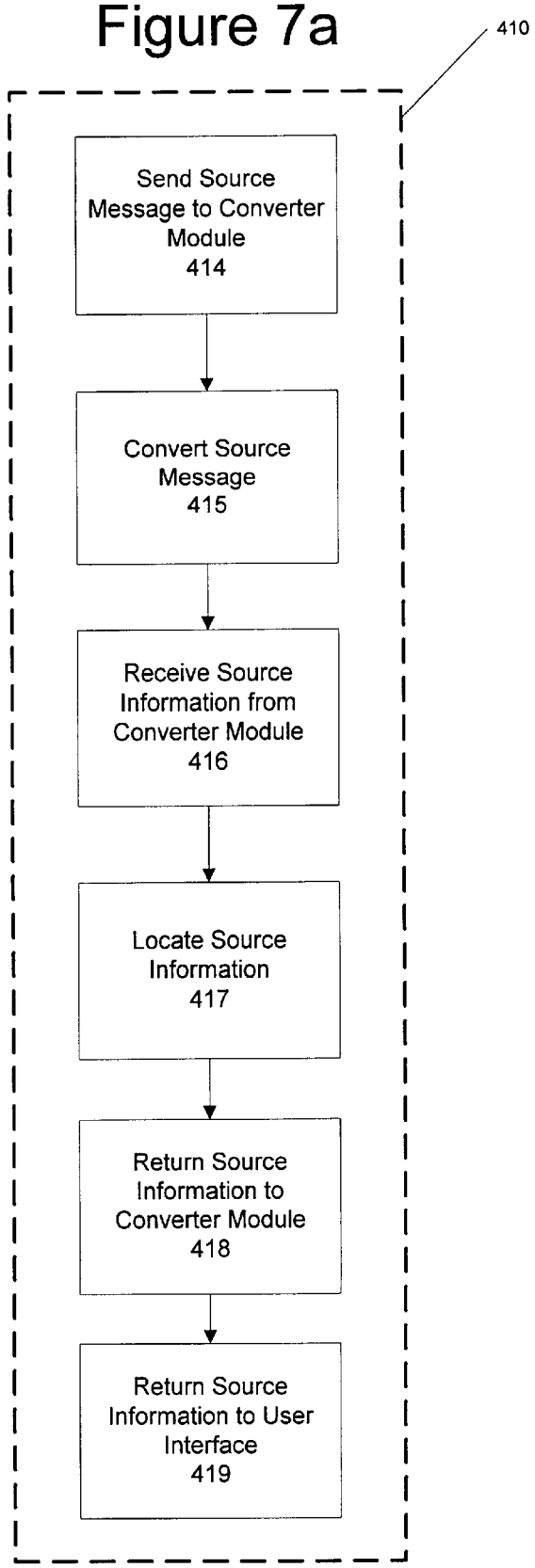
FIG. 7a is a flow chart illustrating an alternate embodiment of the Access Source Information component in accordance with the present invention.

FIG. 7a depicts an alternate embodiment of processing block 410 in an embodiment of the present invention where the user environments 10, 20 are the CICS region 132 and MVS operating system 130, and converter module 204 and communications program 208 are employed. The user interface 200 sends a source message 414 to the converter module 204. A source message is a request for the source information required to identify and retrieve the dataset from storage 60. Source information preferably includes the dataset name and the date/time stamp of the module requested containing the desired source code. However, in alternate embodiments other identifying characteristics of a dataset can be used as the source information.

Figure 7B:
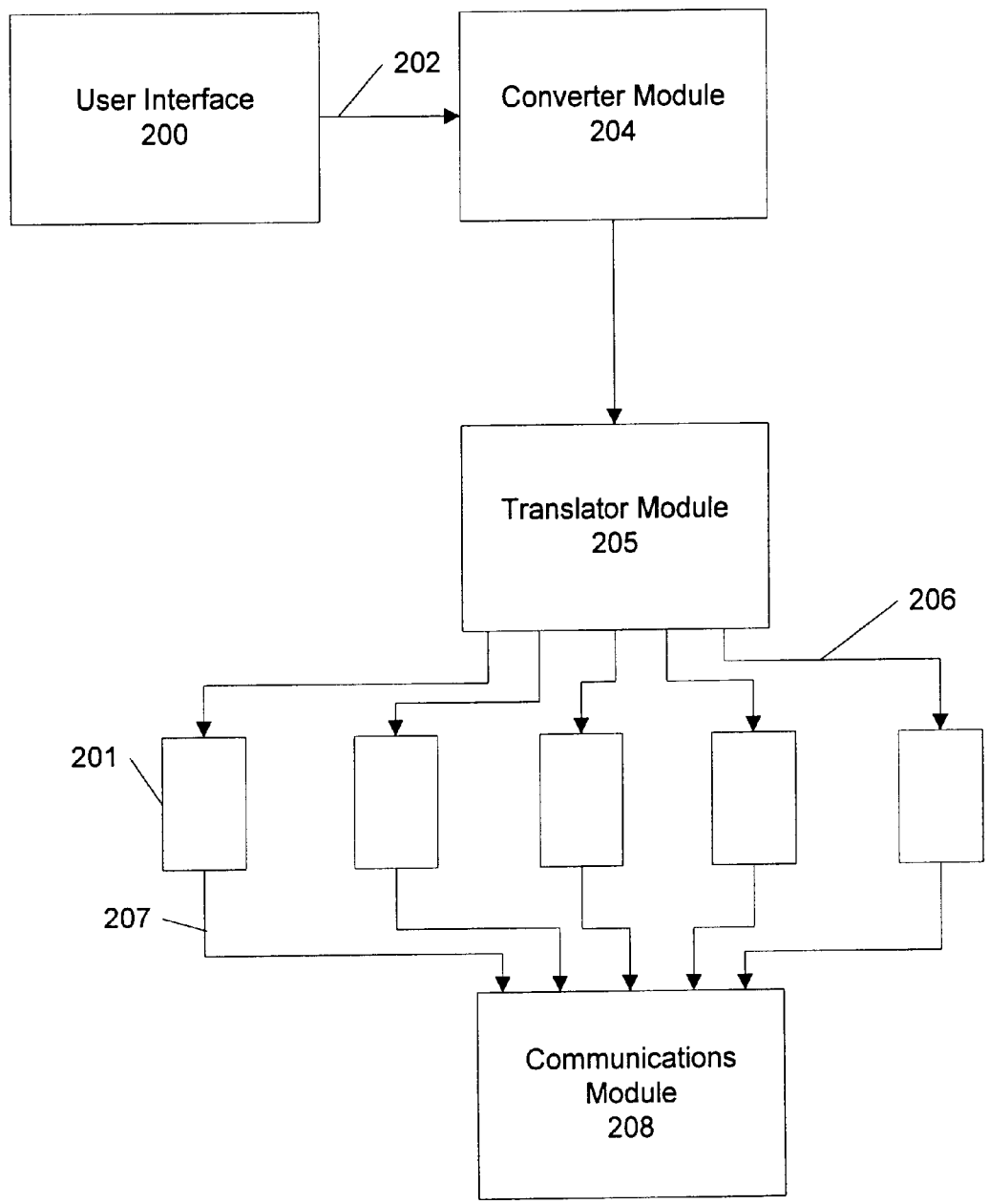
FIG. 7b is a detailed functional block diagram of an embodiment of the network system performing the Access Source Information processing in accordance with the present invention.

The converter module 204 converts 415 the request received from the user interface 200 into a request that is compatible with the communications module 208. More specifically, as shown in FIG. 7*b*, the request 202 received from the user interface 200 may include several different user commands 206, such as download source, set a breakpoint, and set a keep. The converter module 204 uses a translator module 205 to parse the message for each user command 206 contained within the message 202. For each user command 206, there is a corresponding screen command 207. The translator module 205 looks up the corresponding screen command 207 for each user command 206 transmitted by the user interface 200 in a predefined table 201, and transmits the corresponding screen commands 207 to the communications module 208. In one embodiment, the converter module 204 also sets a flag stating that source code is not to be downloaded, as part of the commands sent to the communications module 208.

Referring again to FIG. 7*a*, the converter module 204 request is transmitted through the LU 2.0 connection 116, as specified by the HLLAPI interface. The communications module 208 receives 416 the source request and locates 417 the source information. As shown in FIG. 7*c*, locating 417 the source information is accomplished by issuing 420 program calls to the CICS region 132 to have the requested program loaded off of the storage device 60 and into second memory 150. Then the communications module 208 issues a CICS call to determine 421 the date and time the program was created. Next, the communications module 208 searches for the CICS dataset name using a look-up table. The look-up table is simply an index of program name/date/time information correlated with MVS dataset names as defined by CICS 132. It contains entries for any datasets that are loaded into second memory 150. The communications module 208 searches the table until it finds 422 a match on the requested program's name, date, and time. Once the communications module 208 finds 422 this entry in the table, it retrieves 423 the CICS dataset name, called the DDNAME, from the entry. Once the communications module 208 has the DDNAME of the requested data packet, it calls the CICS command CICSINQ. This is a routine written by CICS that returns the MVS dataset name for a given DDNAME. The CICSINQ command retrieves 424 the dataset name from the dataset stored in second memory 150. Once the communications module 208 has retrieved 424 the MVS dataset name, it packages the program name, and date and time of creation, with the dataset name for the download to the workstation 30. In an embodiment where there are multiple CICS regions 132, the communications module 208 must issue commands to the CICS region 132 that the user 110 is authorized to use. If the source dataset requested does not exist, or exists in an area of storage 60 that the user 110 is not authorized to access, then the MVS operating system 130 returns a message that the source is not found or user does not have access to the source.

The communications module 208 returns 418 the source information to the converter module 204 over the LU 2.0 connection. Although this connection 116 is slow, the amount of data transferred is small, and thus is accomplished quickly. The converter module 204 converts the source information into a compatible format with the user interface 200 in accordance with the process described in FIG. 7*b*. The converter module 204 returns 419 the converted source information 418 to the user interface 200.

Figure 8:
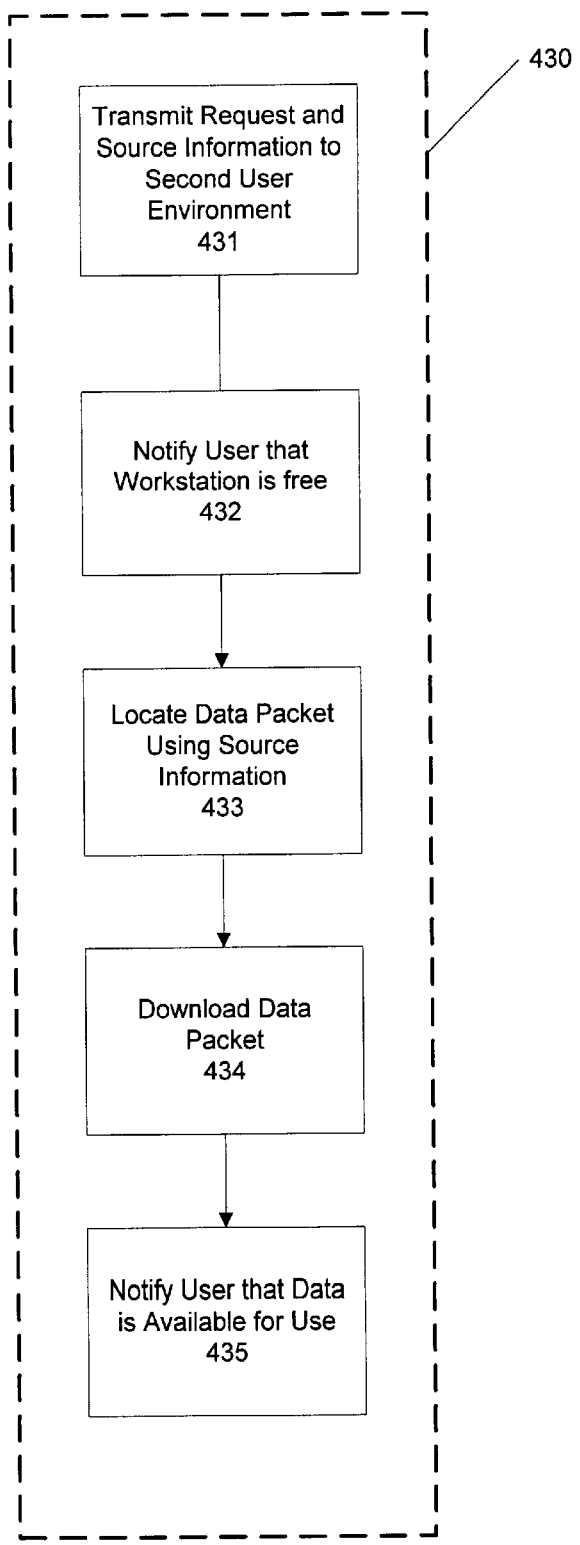
FIG. 8 is a flow chart illustrating an embodiment of the Access Data Packet component in accordance with the present invention.

FIG. 8 shows the Access Data Packet from the Second User Environment 430 block in accordance with e preferred embodiment of the present invention. First, the user interface 200 transmits 431 a request for the source code to the second user environment 20. The user interface 200 attaches the source Information to the request, and both source information and request are transmitted over the fast-speed data transfer facility 50 to the second user environment 20. As soon as the request is made, the workstation 30 is available for use by the user 110. The user interface 200 notifies 432 the user 110 that the user 110 can continue to work on other projects while the data packet is being downloaded.

The second user environment 20 receives the request for download and reads the source information. The second user environment 20 locates 433 the source code by searching storage 60 for a dataset matching the source information. Upon finding the requested dateset, the second user environment 20 downloads 434 the dataset over the fast-speed data transfer facility 50 to the user interface 200. At this point, the user interface 200 notifies 435 the user 110 that the data packet the user 110 requested is now available for use.

Figure 9:
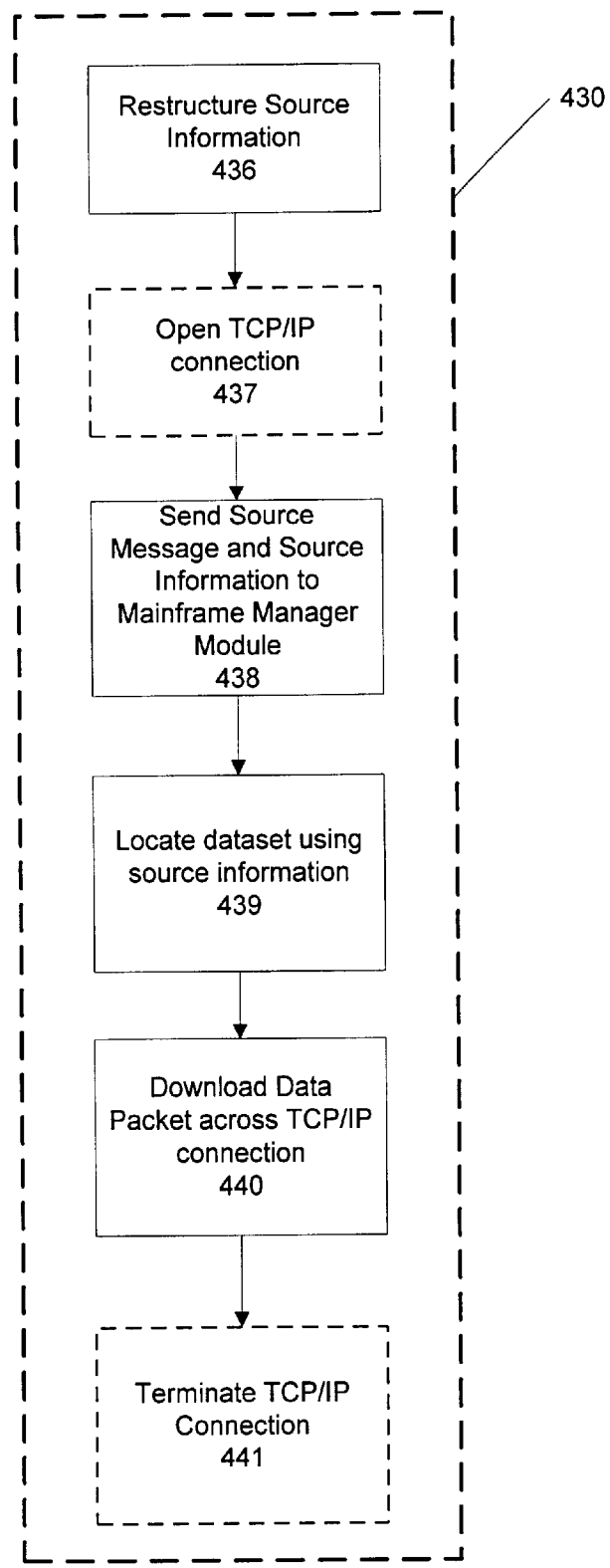
FIG. 9 is a flow chart illustrating an alternate embodiment of the Access Data Packet component in accordance with the present invention.

FIG. 9 is a flow chart illustrating an alternate embodiment of Access Second User Environment 430, where the fast-speed data transfer facility 50 is a TCP/IP connection, the second user environment 20 is the MVS operating system 130, and the mainframe manager module 212 is employed. In one embodiment, the source information received from the first user environment 10 must be restructured 436 into a form recognizable by the mainframe manager module 212. The mainframe manager module 212 expects specific fields and parameters in commands issued to it. Thus, the information received from converter module corresponding to these parameters is stripped and placed into the appropriate mainframe manager module fields.

The User Interface 200 receives a message from converter module 204 in the following format:

```
OPER: X2_SRC_COBOL_INFO                        "COBOL source info"
ELEM: ULONG MAND X2_COBOL_INFO_TOKEN           "Module Handle"
ELEM: UCHAR OPT  X2_COBOL_INFO_ERROR           "Result from req"
ELEM: ULONG OPT  X2_COBOL_INFO_BEG_IDD         "Begin Id Division"
ELEM: ULONG OPT  X2_COBOL_INFO_END_IDD         "End Id Division"
ELEM: ULONG OPT  X2_COBOL_INFO_BEG_EVD         "Begin Environment Division"
ELEM: ULONG OPT  X2_COBOL_INFO_END_EVD         "End Environment Division"
ELEM: ULONG OPT  X2_COBOL_INFO_BEG_CS          "Begin Config Division"
ELEM: ULONG OPT  X2_COBOL_INFO_END_CS          "End Config Division"
ELEM: ULONG OPT  X2_COBOL_INFO_BEG_DD          "Begin Data Division"
ELEM: ULONG OPT  X2_COBOL_INFO_END_DD          "End Data Division"
```

-continued

| ELEM: ULONG OPT X2_COBOL_INFO_BEG_FS | "Begin File Section" |
|---|---|
| ELEM: ULONG OPT X2_COBOL_INFO_END_FS | "End File Section" |
| ELEM: ULONG OPT X2_COBOL_INFO_BEG_WS | "Begin Working-Storage Section" |
| ELEM: ULONG OPT X2_COBOL_INFO_END_WS | "End Working-Storage Section" |
| ELEM: ULONG OPT X2_COBOL_INFO_BEG_LS | "Begin Linkage Section" |
| ELEM: ULONG OPT X2_COBOL_INFO_END_LS | "End Linkage Section" |
| ELEM: ULONG OPT X2_COBOL_INFO_BEG_PD | "Begin Procedure Division" |
| ELEM: ULONG OPT X2_COBOL_INFO_END_PD | "End Procedure Division" |
| ELEM: CSTR OPT X2_COBOL_INFO_DSN | "LP dataset name" |
| ELEM: CSTR OPT X2_COBOL_INFO_TIME | "LP member time" |
| ELEM: CSTR OPT X2_COBOL_INFO_DATE | "LP member date" |

The User Interface 200 then pulls out pieces of this message and creates the following message format for the mainframe manager module 212:

| OPER: CI_SRC_GET_LINES | "Get Sources Lines for CICS" |
|---|---|
| ELEM: ULONG MAND CI_SRC_CICS_LINES_TOKEN | "Module handle" |
| ELEM: ULONG MAND CI_SRC_CICS_FIRST_STATE | "Begin Statement nbr" |
| ELEM: ULONG MAND CI_SRC_CICS_STATE_COUNT | "Nbr of stmts to get" |
| ELEM: ULONG MAND CI_SRC_CICS_AE_ID | "Cobol AE to send" |
| ELEM: CSTR MAND CI_SRC_CICS_DSN | "LP Dataset Name" |
| ELEM: CSTR MAND CI_SRC_CICS_MEMBER | "LP Member Name" |
| ELEM: CSTR MAND CI_SRC_CICS_DATE | "LP Date Stamp" |
| ELEM: CSTR MAND CI_SRC_CICS_TIME | "LP Time Stamp" |
| ELEM: ULONG MAND CI_SRC_CICS_BFRSIZE | "Bfr size of tcp/ip" |
| ELEM: ULONG MAND CI_SRC_CICS_PGMSIZE | "Size of first buffer" |

Note that the DSN, DATE, and TIME fields are present in all three messages. The other fields are converted by extracting the information from the converter module field and placing it in the mainframe manager module field. For example, the converter module 204 transmits the dataset name as a character string X2_COBOL_INFO_DSN. The mainframe manager module 212 transmits the dataset name in the string CI_SRC_CICS_DSN. Thus, the user interface 200 must take the dataset name from the converter module character string and places it in the mainframe manager module format. For the mainframe manager module parameter specifying the number of statements that must be downloaded, the user interface 200 must perform a calculation on two converter module parameters. The converter module 204 transmits a begin Id Division number and an end procedure division number which are the first and last lines of any COBOL source code. The user interface 200 subtracts the two numbers and adds one to the result in order to determine the total number of statements contained within that block of source code. The user interface 200 then inserts that value in a CI_SRC_CICS_STATE COUNT field, which tells mainframe manager module the number of statements it must retrieve. The other fields in the mainframe manager module 212 message (bfrsize, pgmsize, ae_id) are fields that the User Interface 200 gets from sources other than converter module 204.

Next, the user interface 200 sends 438 the restructured source information to the mainframe manager module 212 over the TCP/IP connection 120. The connection to the mainframe manager module 212 was preferably established upon activation of the user interface 200. By establishing a connection upon start-up, in parallel to establishing the CICS connection, the overall download time is shortened. If the TCP/IP connection was not established, the connection is opened 437.

The mainframe manager module 212 issues MVS operating system commands to locate 439 the requested source code. The parameters of the commands are defined by the source information, which are the dataset name and date/time stamp, as defined above. The MVS operating system 130 accesses storage 60 and retrieves the source code using the source information. If the source code has already been loaded into second memory 150, then the MVS operating system 130 simply identifies its location within second memory 150 to mainframe manager module 212. The source code retrieved by MVS 130 includes the source code after being compiled by a compiler, along with other debugging information which is generally hidden from the user 110. The other information typically includes line numbers and the types of lines. The mainframe manager module 212 then downloads 440 the source code using the TCP/IP connection 120. By using the source information retrieved from the CICS region 132, the user 110 is guaranteed that the source code downloaded through the TCP/IP connection exactly matches the source code the user 110 requested from the CICS region 132.

In an alternative embodiment, the user interface 200 terminates 441 the connection to the mainframe manager module 212 after the download is complete. This saves mainframe resources at the cost of lengthening the download time. In the preferred embodiment, the connection to the mainframe manager module 212 is left open to speed future source downloads.

Thus, this invention substantially decreases the transfer rate of data within a network by obtaining the source information of the data from the CICS region 132 over the LU 2.0 connection 116, and retrieving the data itself over the TCP/IP connection 120 from the MVS operating system 130 using the source information obtained from the CICS region 132.

The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

I claim:

1. An apparatus for expediting the transfer of data comprising:

an input port, for receiving requests for data;

an interface memory, coupled to the input port, for storing data, requests for data, and source information of data;

a slow-speed data facility, coupled to the interface memory, for transmitting data;

a first user environment memory, coupled to the slow-speed data facility and a second user environment memory, for storing requests for source information received from the interface memory and storing the source information obtained from the second user environment memory;

the second user environment memory, for storing the requests for data received from the interface memory and for storing data transferred from a storage device;

a fast-speed data facility, coupled to the second user environment module, for transmitting data;

the storage device, coupled to the second user environment module, for storing data in accordance with the source information;

a first processor, coupled to the first user environment memory, the second user environment memory, and the storage device, for retrieving the request for source information from the first user environment memory, retrieving the source information from the second user environment memory, transmitting the source information to the interface memory, retrieving the request for data from the second user environment memory, retrieving the requested data from the storage device, and transmitting the requested data to the interface memory;

a second processor, coupled to the interface memory, the slow-speed data transfer facility and the fast-speed data transfer facility, for retrieving the request for data from the interface memory, for transmitting a request for source information corresponding to the requested data from the first user environment memory, and for requesting the transfer of the requested data from the second user environment memory in accordance with the source information received from the first user environment memory.

2. The apparatus of claim 1, wherein the second processor and the interface memory are located on a workstation, and the first processor, the first user environment, and the second user environments are components of a mainframe system.

3. The apparatus of claim 2, wherein the slow-speed data transfer facility is a cable connection configured for a LU 2.0 protocol.

4. The apparatus of claim 2, wherein the fast-speed data transfer facility is a cable connection configured for a TCP/IP protocol.

5. The apparatus of claim 2, wherein the first user environment memory operates in accordance with a CICS interface system.

6. The apparatus of claim 2, wherein the second user environment memory operates in accordance with an MVS operating system.

7. The apparatus of claim 1, wherein the requested data is source code.

8. The apparatus of claim 1, in a system where datasets have a name and time and date of creation, wherein the source information includes the name of a dataset containing the requested data, and the time and date the dataset was created.

9. The apparatus of claim 1, further comprising a first communications module, coupled to the first processor and the first user environment memory, for controlling the operation of the first user environment memory in response to user commands; and a second communications module, coupled to the first processor and the second user environment memory, for controlling the operation of the second user environment memory in response to user commands.

10. The apparatus of claim 1, further comprising a converter module, coupled to the second processor, the interface memory, and the first communications module, for converting commands transmitted by the second processor into a form recognizable by the first communications module.

* * * * *